US007832543B2

(12) United States Patent
Mustalahti et al.

(10) Patent No.: US 7,832,543 B2
(45) Date of Patent: Nov. 16, 2010

(54) TRAVELATOR SYSTEM

(75) Inventors: Jorma Mustalahti, Hyvinkää (FI); Esko Aulanko, Kerava (FI)

(73) Assignee: Kone Corporation, Helsinki (FI)

(*) Notice: Subject to any disclaimer, the term of this patent is extended or adjusted under 35 U.S.C. 154(b) by 724 days.

(21) Appl. No.: 11/630,359

(22) PCT Filed: May 4, 2005

(86) PCT No.: PCT/FI2005/000206

§ 371 (c)(1),
(2), (4) Date: Dec. 21, 2006

(87) PCT Pub. No.: WO2006/003236

PCT Pub. Date: Jan. 12, 2006

(65) Prior Publication Data

US 2008/0035447 A1 Feb. 14, 2008

(30) Foreign Application Priority Data

Jun. 30, 2004 (FI) .................................. 20040907

(51) Int. Cl.
*B65G 13/00* (2006.01)
*B65G 47/31* (2006.01)

(52) U.S. Cl. ...................... 198/334; 198/324; 198/418.1

(58) Field of Classification Search ................. 198/332, 198/460.1, 461

See application file for complete search history.

(56) References Cited

U.S. PATENT DOCUMENTS 1,412,969 A 4/1922 Sachs (Continued)

FOREIGN PATENT DOCUMENTS

FR 549153 A 2/1923

(Continued)

OTHER PUBLICATIONS

Finnish Search Report issued in FI20040907 on Feb. 25, 2005.

(Continued)

*Primary Examiner*—Gene Crawford
*Assistant Examiner*—Kavel P Singh
(74) *Attorney, Agent, or Firm*—Venable LLP; Robert Kinberg; Ryan M. Flandro

(57) ABSTRACT

A travelator system for conveying a passenger, comprising a main conveyor and a branch conveyor. The main conveyor includes a first plurality of shafts each having a first plurality of belt pulleys disposed side by side thereon. The main conveyor also includes a plurality of mutually parallel endless belt loops which define a moving conveying surface of the main conveyor, each belt loop being passed over a belt pulley on two different shafts. Adjacent belt loops on the same common shaft are passed over different belt pulleys such that a first belt loop is passed over a belt pulley on a previous shaft relative to the common shaft in a transport direction of the main conveyor, while a second belt loop is passed over a belt pulley on a following shaft relative to the common shaft in a transport direction of the main conveyor. The branch conveyor branches off of the main conveyor in a connecting section to allow passengers to enter from the branch conveyor onto the main conveyor and/or to exit from the main conveyor onto the branch conveyor. The branch conveyor is also implemented using shafts, belt pulleys, and belt loops similar to the main conveyor. In the connecting section, the branch conveyor and the main conveyor share at least one common shaft.

30 Claims, 4 Drawing Sheets

U.S. PATENT DOCUMENTS

| | | | | | |
|---|---|---|---|---|---|
| 1,665,483 | A | * | 4/1928 | Taylor | 104/25 |
| 1,689,201 | A | | 10/1928 | Halter | |
| 2,769,522 | A | | 11/1956 | Pfeiffer | |
| 3,518,944 | A | * | 7/1970 | Patin | 198/789 |
| 3,592,139 | A | | 7/1971 | Patin | |
| 4,232,776 | A | | 11/1980 | Dean | |
| 5,341,915 | A | * | 8/1994 | Cordia et al. | 198/460.1 |
| 6,951,274 | B2 | * | 10/2005 | Zeitler et al. | 198/890 |

FOREIGN PATENT DOCUMENTS

| | | | |
|---|---|---|---|
| GB | 217308 | A | 6/1924 |
| JP | 08-133465 | A | 9/1996 |
| JP | 2003-20181 | | 2/2003 |
| WO | WO 2005/051829 | A | 6/2005 |

OTHER PUBLICATIONS

International Search Report and Written Opinion (Apr. 4, 2006), PCT/FI2005/000206, filed May 4, 2005.

* cited by examiner

TRAVELATOR SYSTEM

CROSS-REFERENCE TO RELATED APPLICATIONS

This application is a National Stage application of International Application No. PCT/FI2005/000206, filed May 4, 2005, which claims the priority benefit of Application No. FI20040907, filed in Finland on Jun. 30, 2004. The disclosures of the above-referenced applications are expressly incorporated herein by reference together with each U.S. and foreign patent and patent application mentioned below.

BACKGROUND OF THE INVENTION

1. Field of the Invention

The present invention relates to a travelator system for conveying passengers.

2. Related Art

Travelators intended for transporting passengers are known e.g. from the following patent documents: Japanese patent document JP 2003-20181, U.S. Pat. No. 1,689,201, U.S. Pat. No. 2,769,522, and U.S. Pat. No. 3,592,139. In these, the conveyor includes a large number of adjacent narrow belt loops, several such belt loops being arranged over the width of the conveyor to transport users of the travelator. The conveyor has a large number of shafts arranged parallel to each other, at a distance from each other and transverse to the transport direction of the conveyor. Connected to each shaft are a number of belt pulleys placed side by side.

Further, the conveyor comprises a number of mutually parallel endless belt loops, which form the moving conveying surface of the conveyor. The mutual arrangement of the belt loops is so implemented that they are interlaced with respect to each other in a comb-like fashion around each shaft. Each belt loop is passed over two belt pulleys on two successive shafts. Of each two closely adjacent belt loops on the same common shaft that are passed over adjacent belt pulleys, one belt loop is passed over a belt pulley on the previous shaft adjacent to the common shaft while the other belt loop adjacent to the aforesaid belt is passed over a belt pulley on the next shaft adjacent to the aforesaid common shaft.

This prior-art type of travelator is designed to convey passengers from end to end, in other words, users board the travelator at one end and leave it at the other end.

A so-called fast travelator has a relatively high transport speed and it may be very long, even hundreds of meters. Such a long travelator provides the best service to areas located near the ends of the travelator. If more closely spaced areas are to be served, then it is necessary to build shorter travelators, and these have to be installed in a chain one after the other. However, in this case a higher speed of the travelator provides no corresponding advantage because time is wasted on accelerations in an acceleration section and on decelerations in a deceleration section. For example, if the nominal speed is 5 m/s, the acceleration and deceleration sections would already have a total length of about 100 m. Acceleration and deceleration require about 20 s extra time plus the time spent on walking between travelators. This type of a travelator system consisting of successive travelators provides no good service to those who travel long distances on them.

Further, U.S. Pat. No. 3,518,944 discloses a travelator which may be provided with entry and exit branchings. However, this travelator is not of the above-mentioned travelator type in which the conveying surface includes adjacent belt loops interlaced with respect to each other. Instead, in this document the conveying surface of the conveyor includes a large number of adjacently mounted rotatable rollers of small diameter. The conveying surface having separate rollers in the main and branch conveyors is not even and not a very good surface to stand or step on. Moreover, the conveying speed achieved with the construction described in the above-mentioned document is very low (about 700 mm/s) and does not allow long travelators to be built in an economically reasonable manner.

SUMMARY

An object of the invention is to overcome the above-mentioned drawbacks.

Another object of the invention is to disclose a travelator system provided with intermediate entry connections and intermediate exit connections, giving new possibilities to make long and fast travelators that will provide good and efficient service to the entire area covered by the conveyor.

A further object of the invention is to disclose a travelator system that will serve people who travel long distances, minimizing their journey time, while at the same time serving people who make short trips, allowing them to board the main conveyor from the side and to leave the main conveyor, which may have a high conveying speed.

A further object of the invention is to disclose a travelator system having a conveyor construction that allows the conveying surface to extend substantially continuously and evenly without any discontinuities between the main conveyor and the branch conveyor branching off from it.

Example embodiments are presented in the following description and drawings of the present application. The inventive content disclosed in the application can also be defined in other ways than is done in the claims below. The inventive content may also include several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic inventive concept and/or inventive content, features and details of different embodiments of the invention can be applied in conjunction with other embodiments.

According to an embodiment of the invention, the travelator comprises a branch conveyor, which branches off in a connecting section with respect to the main conveyor to allow passengers to enter from the branch conveyor onto the main conveyor and/or to exit from the main conveyor onto the branch conveyor. The construction principle of the branch conveyor corresponds to that of the main conveyor. Thus, the branch conveyor comprises a number of shafts arranged to be parallel to each other, at a distance from each other and transverse to the transport direction of the conveyor, with a number of belt pulleys mounted side by side on each shaft. Further, the branch conveyor comprises a number of mutually parallel endless belt loops, each one of said belt loops being passed over two belt pulleys on two different shafts in such manner that, of each two closely adjacent belt loops on the same common shaft that are passed over adjacent belt pulleys, one belt loop is passed over a belt pulley on a previous shaft relative to the common shaft while the other belt loop is passed over a belt pulley on a following shaft relative to the common shaft. In the connecting section the branch conveyor and the main conveyor have at least one common shaft.

This embodiment of the invention has the advantage that the intermediate entry connections and intermediate exit connections give new possibilities to make long and fast travelators that will provide good and efficient service to the entire area covered by the conveyor.

A further advantage of this embodiment of the invention is that the travelator system will serve people who travel long distances, minimizing their journey time, while at the same time serving people who make short trips, allowing them to board the main conveyor from the side and to leave the main conveyor, which may have a high conveying speed.

An additional advantage of this embodiment of the invention is a conveyor construction that allows the conveying surface to extend substantially continuously and evenly without any discontinuities between the main conveyor and the branch conveyor.

The belt loops comprised in the conveying surface of the travelator system may serve as power transmitting belts or the power transmission to the shafts may be at least partly implemented via external power transmission.

In an embodiment of the travelator system, the connecting section between the main conveyor and the branch conveyor comprises a widening area where the main and branch conveyors have several shafts in common and where the main conveyor widens to the width of the branch conveyor. In the widening area the shaft lengths are mutually different in the transport direction and change between the width of the main conveyor and the total width of the main and branch conveyors.

In an embodiment of the travelator system, the main conveyor comprises an acceleration section for accelerating the passenger transport speed from a substantially slow initial speed to a heightened transport speed. Further, the main conveyor comprises a constant-speed section for conveying the passenger at a constant transport speed, and to which section the branch conveyor is connected. In addition, the main conveyor comprises a deceleration section for decelerating the passenger transport speed from the constant transport speed to a decelerated final speed.

In an embodiment of the travelator system, the system comprises a branch conveyor that forms an entrance to the main conveyor. The branch conveyor comprises an acceleration section for accelerating the passenger transport speed from a substantially slow initial speed to a heightened transport speed corresponding to the transport speed of the main conveyor at the point where the branch conveyor is connected to the main conveyor.

In an embodiment of the travelator system, the system comprises a branch conveyor that forms an exit from the main conveyor. The branch conveyor comprises a deceleration section for decelerating the passenger transport speed from the main conveyor's transport speed to a decelerated final speed.

In an embodiment of the travelator system, the system comprises a branch conveyor that comprises a constant-speed section for conveying the passenger at a constant transport speed.

In an embodiment of the travelator system, the system comprises at least two main conveyors, the constant-speed sections of which intersect each other at different levels. The transport speed of the branch conveyor is substantially the same as the constant transport speed of the main conveyors. The branch conveyor is arranged to interconnect the constant-speed sections of the main conveyors so as to allow passengers to be transferred from one main conveyor onto the other main conveyor.

In an embodiment of the travelator system, the travelator system forms a public transport network comprising a number of mutually intersecting main conveyors at different levels and a number of branch conveyors branching off from them.

In an embodiment of the travelator system, the two belt pulleys provided for each belt loop and placed on different shafts comprise a first belt pulley and a second belt pulley. In the deceleration and acceleration sections, a transmission ratio exists between the first belt pulley and the second belt pulley.

In an embodiment of the travelator system, the transmission ratio is determined by the ratio of the diameters of the first belt pulley and the second belt pulley.

In an embodiment of the travelator system, in the acceleration section the diameter of the first belt pulley is larger than the diameter of the second belt pulley.

In an embodiment of the travelator system, in the deceleration section the diameter of the first belt pulley is smaller than the diameter of the second belt pulley.

In an embodiment of the travelator system, the belt loops are toothed belts. In the deceleration/acceleration section, the first belt pulley and the second belt pulley are toothed belt pulleys having different numbers of teeth, the transmission ratio between the first belt pulley and the second belt pulley being thus determined by the ratio of the numbers of teeth on the belt pulleys.

In an embodiment of the travelator system, in the acceleration section the transmission ratio between the first belt pulley and the second belt pulley is $1<i\leqq 1.1$.

In an embodiment of the travelator system, in the deceleration section the transmission ratio between the first belt pulley and the second belt pulley is $1>i\geqq 0.9$.

In an embodiment of the travelator system, the initial speed and the final speed of the travelator are of the order of about 0.5-0.7 m/s.

In an embodiment of the travelator system, the transport speed in the constant-speed section is of the order of about 2.5-7 m/s, suitably about 3-6 m/s and preferably about 5 m/s.

In an embodiment of the travelator system, the change in transport speed in the acceleration section is so adapted that the average acceleration experienced by the passengers is of the order of about 0.3 $m/s^2$.

In an embodiment of the travelator system, the change in transport speed in the deceleration section is so adapted that the average deceleration experienced by the passengers is of the order of about 0.3 $m/s^2$.

In an embodiment of the travelator system, the travelator system is composed from conveyors designed to be mounted on a fixed base, such as a floor, the ground or some other support.

BRIEF DESCRIPTION OF THE DRAWINGS

Aspects of the invention will now be described by way of example only with reference to the accompanying drawings in which.

DETAILED DESCRIPTION

Figure 1:
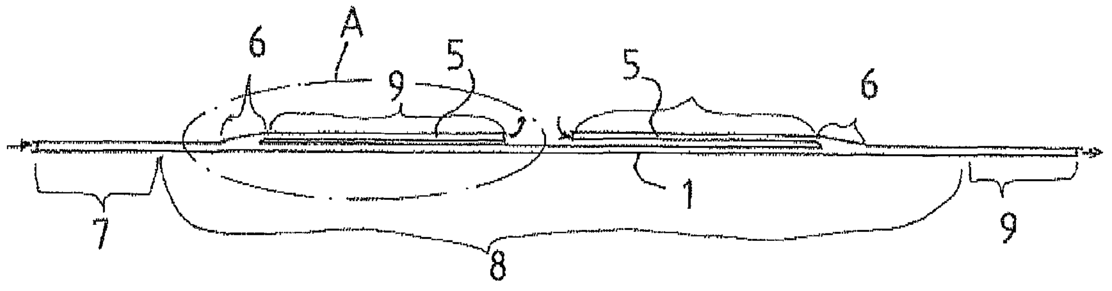
FIG. 1 depicts a diagrammatic top view of a first embodiment of the travelator system of the invention.

FIG. 1 depicts a travelator system formed from low-construction conveyors 1 and 5 designed to be mounted on a fixed base, such as a floor, the ground or some other support.

The main conveyor 1 has at its beginning an acceleration section 7, which accelerates the passenger transport speed from a substantially slow initial speed corresponding to walking speed to a heightened transport speed. The initial speed is preferably 0.5-0.7 m/s. After the acceleration section in the transport direction, the conveyor has a constant-speed section 8 for conveying the passenger at a relatively high constant transport speed. The transport speed in the constant-speed section 8 is of the order of about 2.5-7 m/s, suitably about 3-6 m/s and preferably about 5 m/s. After the constant-speed section 8 the main conveyor has a deceleration section 9 for slowing down the passenger transport speed from the constant transport speed back to a decelerated final speed corresponding to walking speed. The final speed is preferably of the order of about 0.5-0.7 m/s. In the acceleration section 7 the change in transport speed is preferably so adapted that the average acceleration experienced by the passengers is of the order of about 0.3 $m/s^2$. In the deceleration section 9 the change in transport speed is so adapted that the average deceleration experienced by the passengers of the order of about 0.3 $m/s^2$.

Figure 2:
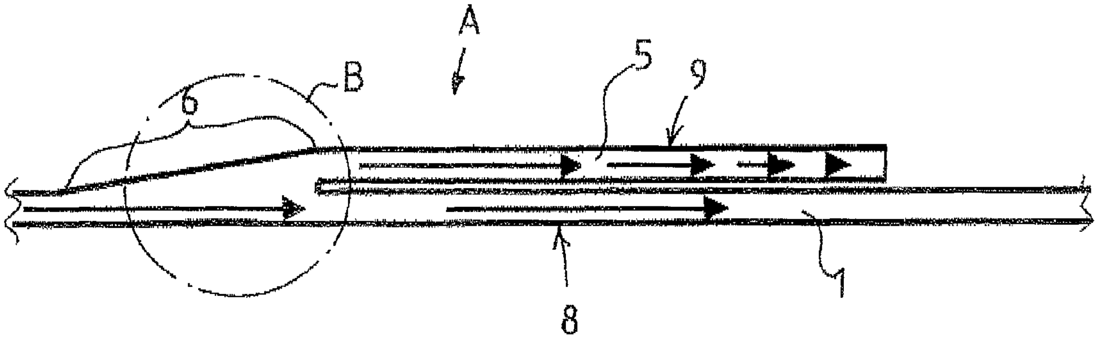
FIG. 2 depicts detail A from FIG. 1.

The travelator schematically depicted in FIG. 1 comprises two branch conveyors 5, a first and a second branch conveyor 5. The first branch conveyor 5, shown on the left in FIG. 1 and as detail A in FIG. 2, is arranged to branch off in the connecting section 6 from the fast constant-speed section 8 of the main conveyor 1 and allows passengers to exit from the main conveyor 1 onto the first branch conveyor 5 and thus to dismount from the travelator. The first branch conveyor 5 extends alongside the main conveyor 1 in a direction substantially parallel to it. The first branch conveyor 5 provides an exit route comprising a deceleration section 9, which may begin immediately after the connecting section 6, or already in the connecting section 6, or alternatively some distance after the connecting section 6, in which case the first branch conveyor 5 has after the connecting section 6 a constant-speed section 8 of some length. If the first branch conveyor 5 is very long, it may also comprise constant-speed portions 8.

The example travelator depicted in FIG. 1 also comprises a second branch conveyor 5, shown on the right in FIG. 1. The second branch conveyor 5 is connected in the connecting section 6 to the fast constant-speed section 8 of the main conveyor 1 and allows passengers to enter via the acceleration section of the second branch conveyor 5 onto the fast constant-speed section of the main conveyor 1.

In the connecting section 6, the respective transport speeds of the first and second branch conveyors 5 and the main conveyor 1 are substantially the same.

Referring to FIG. 2, when a passenger is approaching on the main conveyor 1 and wishes to exit via the first branch conveyor 5, he/she will move to the left on the connecting section 6 to the widening area between the main conveyor 1 and the first branch conveyor 5, from where he/she then continues on the first branch conveyor 5, the speed of which begins to slow down in the deceleration section 9 after the connecting section 6. Passengers continuing straight forward on the travelator remain on the main conveyor 1 and go on traveling at the same speed. Thus, those who continue straight forward do not lose any time on extra decelerations, accelerations and walking portions.

Figure 3:
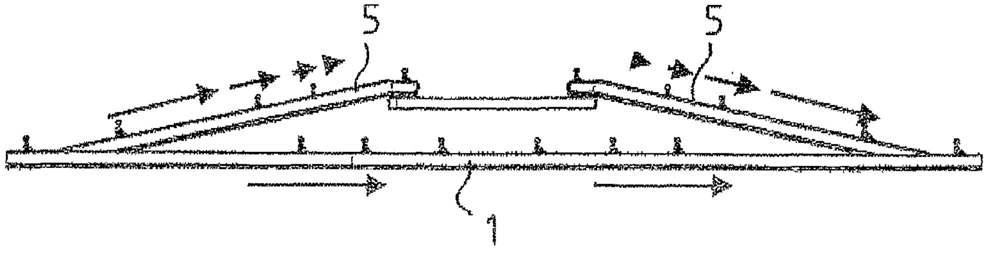
FIG. 3 depicts a diagrammatic side view of a second embodiment of the travelator system of the invention.

FIG. 3 depicts an embodiment in which the entry and exit ends of the first and second branch conveyors 5 are situated at different levels, for example, at a higher level relative to the level of the main conveyor 1. In this case, the first and second branch conveyors 5 are inclined moving ramps.

Figure 4:
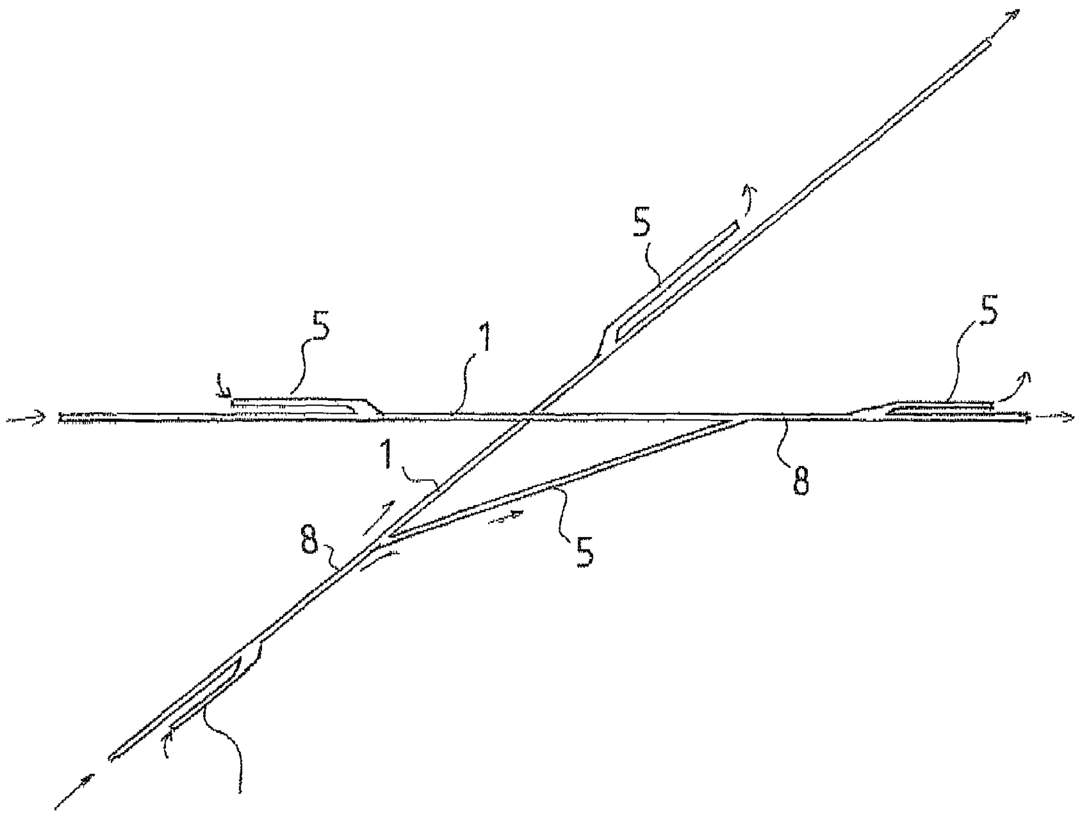
FIG. 4 depicts a diagrammatic top view of a third embodiment of the travelator system of the invention.

FIG. 4 schematically illustrates a travelator system that forms a public transport network comprising a plurality of mutually intersecting main conveyors 1 situated at different levels and a plurality of branch conveyors 5 branching off from them. The system depicted in FIG. 4 comprises two main conveyors 1, whose constant-speed sections 8 intersect at different levels. One branch conveyor 5 connects the constant-speed sections 8 of the main conveyors 1 to each other to transfer passengers from one main conveyor 1 onto the intersecting other main conveyor 1. In this case the transport speed of the branch conveyor 5 is substantially the same as the constant transport speed in the constant-speed sections 8 of the main conveyors 1.

Figure 5:
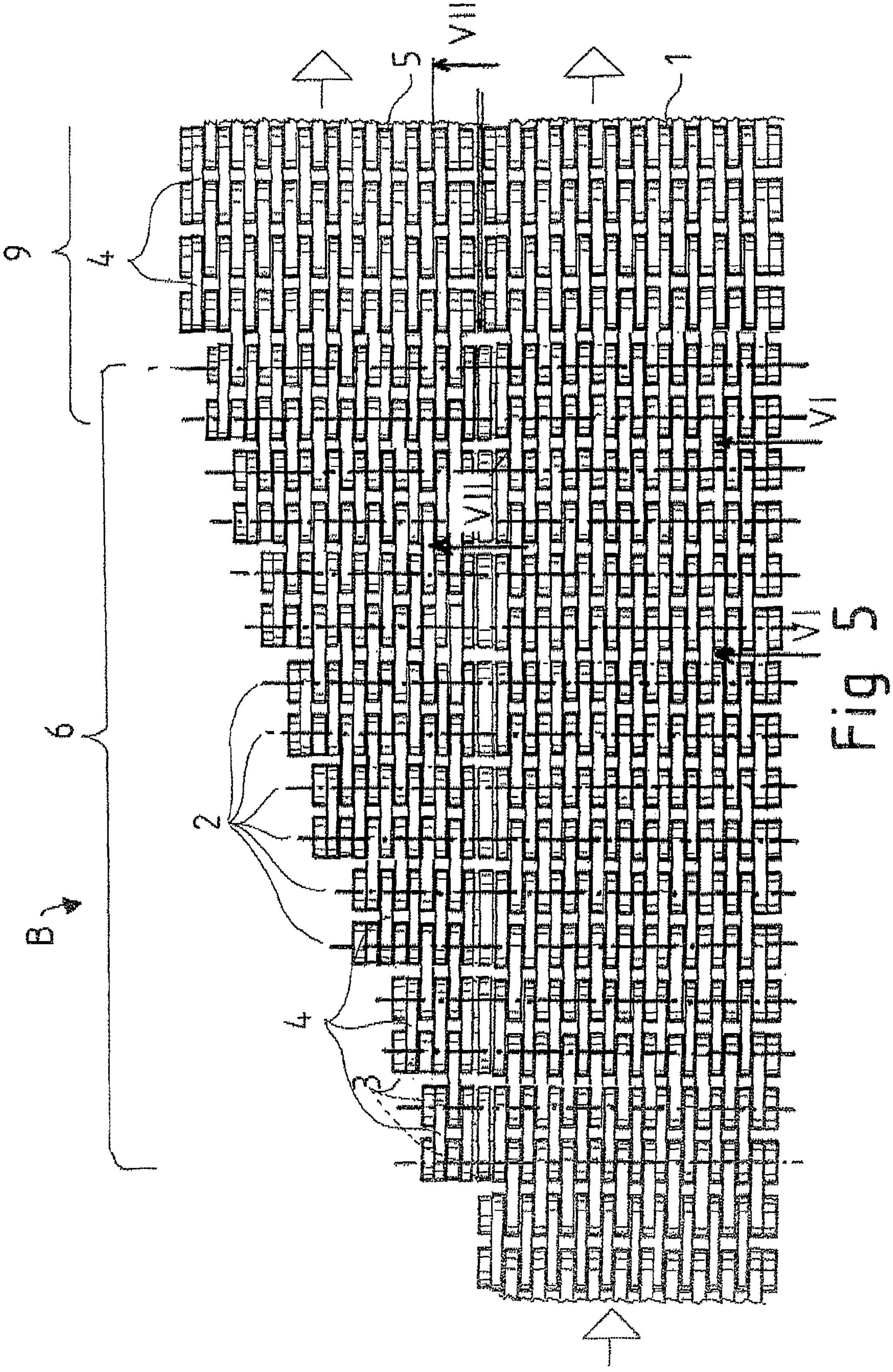
FIG. 5 depicts detail B from FIG. 2.

FIG. 5 depicts the intersection between the main conveyor 1 and the branch conveyor 5 when the branch conveyor 5 constitutes an exit route. FIG. 5 shows a detailed view of the structure of the main and branch conveyors 1, 5, respectively.

Both the main conveyor 1 and the branch conveyor 5 comprise a plurality of shafts 2 so arranged that they are parallel to each other at a distance from each other and transverse to the transport direction of the main and branch conveyors 1, 5. Mounted side by side on each shaft 2 are a plurality of belt pulleys 3. Further, the main conveyor 1 and the branch conveyor 5 each comprise a plurality of parallel endless belt loops 4, which form the conveying surface of the main and branch conveyors 1 and 5. The belt loops 4 are preferably toothed belts. Correspondingly, the belt pulleys 3 are toothed belt pulleys, a plurality of such pulleys being mounted side by side on each shaft 2.

Figure 6:
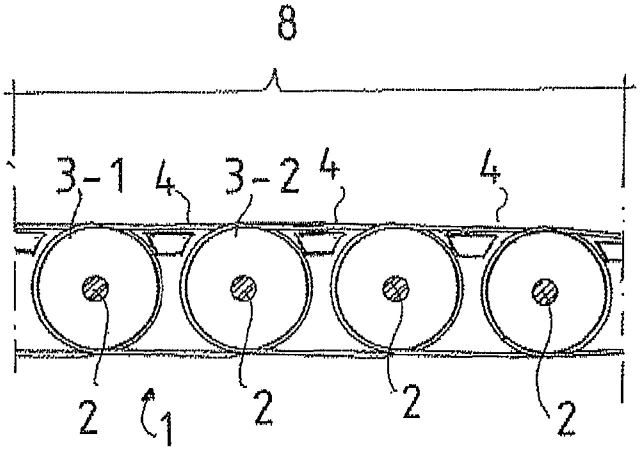
FIG. 6 depicts a diagrammatic section VI-VI from FIG. 5.
Figure 7:
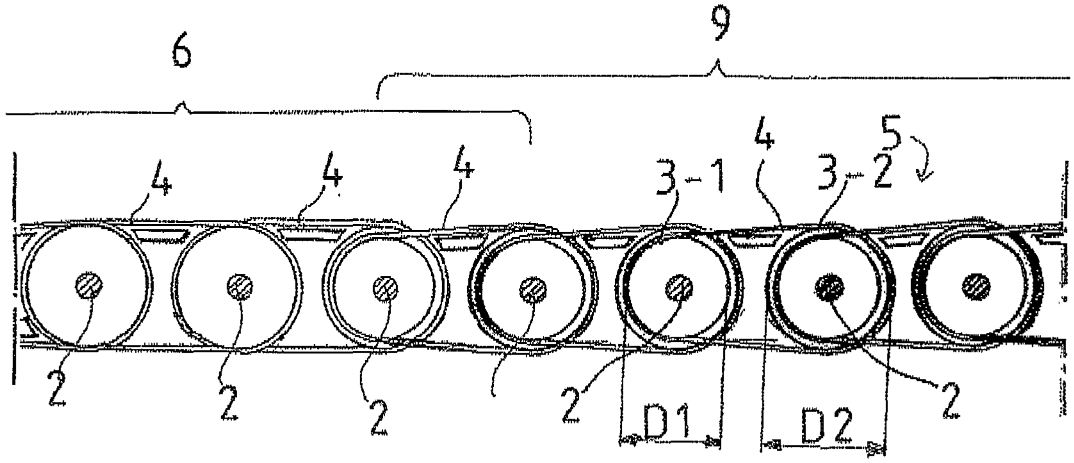
FIG. 7 depicts a diagrammatic section VII-VII of the main conveyor in FIG. 5.

As is also seen from the sectional views in FIG. 5-7, each one of the belt loops 1 is passed over two belt pulleys 3 on two different shafts 2 in such manner that, of each two closely adjacent belt loops 4 on the same common shaft 2 that are passed over adjacent belt pulleys 3, one belt loop 4 is passed over a belt pulley 3 on a previous shaft 2 relative to the common shaft 2 in the transport direction while the other belt loop 4 is passed over a belt pulley 3 on a following shaft 2 relative to the common shaft 2 in the transport direction.

In the widening area between the main conveyor 1 and the branch conveyor 5 in the connecting section 6, the main conveyor 1 and the branch conveyor have a number of common shafts 2, the transverse lengths of which shafts, as seen in the transport direction, are mutually different, changing between the width of the main conveyor 1 and the total width of the main and branch conveyors 1, 5. These shafts 2 are mounted with bearings (not shown) at either end on the frame structure of the conveyor.

FIG. 6 shows a part of the constant-speed section 8 of the main conveyor 1. The two belt pulleys 3 provided for each belt loop 4 and placed on different shafts 2 comprise a first belt pulley 3-1 and a second belt pulley 3-2. In the constant-speed section 8 of the main conveyor 1 in FIG. 5, the first belt pulley 3-1 and the second belt pulley 3-2 have a transmission ratio of i=1, i.e. no transmission ratio difference between them. The transmission ratio i is determined by the ratio D1/D2 of the diameters of the first belt pulley 3-1 and the second belt pulley 3-2, the diameters being equal in this case.

FIG. 7 shows a part of the connecting section 6 and of the branch conveyor 5. The deceleration section 9 begins some distance before the end of the connecting section 6. In the deceleration section 9, the diameter D1 of the first belt pulley 3-1 is smaller than the diameter D2 of the second belt pulley 3-2. In the deceleration section 9, the transmission ratio between the first belt pulley 3-1 and the second belt pulley 3-2 is $1>i\geqq 0.9$.

In the acceleration section 7 (not shown), the diameter D1 of the first belt pulley 3-1 is larger than the diameter D2 of the second belt pulley 3-2. In the acceleration section 7, the transmission ratio between the first belt pulley 3-1 and the second belt pulley 3-2 is $1<i\leqq 1.1$.

The invention is not limited to the example embodiments described above; instead, many variations are possible within the scope of the inventive concept defined in the claims.

The invention claimed is:

1. A travelator system for conveying a passenger, comprising:

a main conveyor arranged to convey the passenger in a transport direction, comprising:

a plurality of main shafts arranged parallel to one another and at a distance from one another, wherein each main shaft extends transversely to the transport direction of the main conveyor and includes a plurality of main belt pulleys arranged side by side thereon; and a plurality of mutually parallel endless main belt loops arranged to define a passenger conveying surface of the main conveyor, each one of the main belt loops being passed over main belt pulleys on two different main shafts, wherein a first main belt loop and a second main belt loop are disposed immediately adjacent to one another and pass over a common shaft, the first main belt loop being passed over a main belt pulley on a main shaft positioned before the common shaft in the transport direction of the main conveyor, and the second main belt loop being passed over a main belt pulley on a main shaft positioned after the common shaft in the transport direction of the main conveyor; and a branch conveyor connected to the main conveyor at a connecting section and arranged to allow the passenger to enter onto the main conveyor and/or to exit from the main conveyor, the branch conveyor comprising:

a plurality of branch shafts arranged parallel to one another and at a distance from one another, wherein each branch shaft extends transversely to a transport direction of the branch conveyor and includes a plurality of branch belt pulleys arranged side by side thereon; and a plurality of mutually parallel endless branch belt loops arranged to define a passenger conveying surface of the branch conveyor, each one of the branch belt loops being passed over a branch belt pulley on two different branch shafts, wherein a first branch belt loop and a second branch belt loop are disposed immediately adjacent to one another and pass over the common shaft in the connecting section, the first branch belt loop being passed over a branch belt pulley on a branch shaft positioned before the common shaft in the transport direction of the branch conveyor, and the second branch belt loop being passed over a branch belt pulley on a branch shaft positioned after the common shaft in the transport direction of the branch conveyor.

2. The travelator system according to claim 1, wherein the connecting section between the main conveyor and the branch conveyor comprises a conveying area of variable width, the main conveyor and the branch conveyor sharing a plurality of common shafts in the connecting section, the common shafts having mutually different lengths in the transport direction.

3. The travelator system according to claim 1, wherein the main conveyor further comprises:

an acceleration section for accelerating a passenger transport speed from a substantially slow initial speed to a heightened transport speed;

a constant-speed section for conveying the passenger at a constant transport speed, the branch conveyor being connected to the constant-speed section; and a deceleration section for decelerating the passenger transport speed from the constant transport speed to a decelerated final speed.

4. The travelator system according to claim 1, wherein the branch conveyor defines an entrance to the main conveyor, the branch conveyor comprising an acceleration section for accelerating a passenger transport speed from a substantially slow initial speed to a heightened transport speed corresponding to a constant transport speed of the main conveyor at a point where the branch conveyor is connected to the main conveyor.

5. The travelator system according to claim 1, wherein the branch conveyor defines an exit from the main conveyor, the branch conveyor comprising a deceleration section for decelerating a passenger transport speed from a constant transport speed of the main conveyor to a decelerated final speed.

6. The travelator system according to claim 1, wherein the branch conveyor comprises a constant-speed section for conveying the passenger at a constant transport speed.

7. The travelator system according to claim 1, wherein the main conveyor further comprises:

a first main conveyor having a first constant-speed section; and a second main conveyor having a second constant-speed section and arranged to intersect the first main conveyor at a different level, wherein the branch conveyor is arranged to interconnect the first and second constant-speed sections of the first and second main conveyors to allow the passenger to be transferred from the first main conveyor onto the second main conveyor and wherein a transport speed of the branch conveyor is substantially the same as a constant transport speed of the first and second constant-speed sections of the first and second main conveyors.

8. The travelator system according to claim 1, wherein the travelator system defines a public transport network comprising:

a plurality of main conveyors intersecting one another at different levels; and a plurality of branch conveyors branching off from each of the plurality of main conveyors.

9. The travelator system according to claim 4, wherein the plurality of branch belt pulleys arranged on the branch shafts of the branch conveyor comprise a first branch belt pulley and a second branch belt pulley on different branch shafts, the first branch belt pulley and the second branch belt pulley having a transmission ratio therebetween in the acceleration section.

10. The travelator system according to claim 9, wherein the transmission ratio is determined by the ratio of a diameter of the first branch belt pulley relative to a diameter of the second branch belt pulley.

11. The travelator system according to claim 10, wherein, in the acceleration section of the branch conveyor, the diameter of the first branch belt pulley is larger than the diameter of the second branch belt pulley.

12. The travelator system according to claim 5, wherein the plurality of second branch belt pulleys arranged on the branch shafts of the branch conveyor comprise a first branch belt pulley and a second branch belt pulley on different branch shafts, the first branch belt pulley and second branch belt pulley having a transmission ratio therebetween in the deceleration section.

13. The travelator system according to claim 12, wherein the transmission ratio is determined by the ratio of a diameter of the first branch belt pulley relative to a diameter of the second branch belt pulley.

14. The travelator system according to claim 13, wherein, in the deceleration section of the branch conveyor, the diameter of the first branch belt pulley is smaller than the diameter of the second branch belt pulley.

15. The travelator system according to claim 9, wherein the plurality of branch belt loops are toothed belts and the first and second branch belt pulleys are toothed belt pulleys having different numbers of teeth, the transmission ratio between the first branch belt pulley and the second branch belt pulley being the ratio of the number of teeth on the first branch belt pulley relative to the number of teeth on the second branch belt pulley.

16. The travelator system according to claim 15, wherein, in the acceleration section of the branch conveyor, the transmission ratio between the first branch belt pulley and the second branch belt pulley is at least 1 and smaller than 1.1.

17. The travelator system according to claim 12, wherein the plurality of branch belt loops are toothed belts and the first and second branch belt pulleys are toothed belt pulleys having different numbers of teeth, the transmission ratio between the first branch belt pulley and the second branch belt pulley being the ratio of the number of teeth on the first branch belt pulley relative to the number of teeth on the second branch belt pulley.

18. The travelator system according to claim 17, wherein, in the deceleration section of the branch conveyor, the transmission ratio between the first branch belt pulley and the second branch belt pulley is at most 1 and greater than 0.9.

19. The travelator system according to claim 3, wherein the initial speed and the final speed of the main conveyor of the travelator are about 0.5-0.7 m/s.

20. The travelator system according to claim 4, wherein the initial speed of the branch conveyor of the travelator is about 0.5-0.7 m/s.

21. The travelator system according to claim 5, wherein the final speed of the branch conveyor of the travelator is about 0.5-0.7 m/s.

22. The travelator system according to claim 3, wherein the constant transport speed in the constant-speed section of the main conveyor is about 2.5-7 m/s.

23. The travelator system according to claim 22, wherein the constant transport speed in the constant-speed section of the main conveyor is about 3-6 m/s.

24. The travelator system according to claim 23, wherein the constant transport speed in the constant-speed section of the main conveyor is about 5 m/s.

25. The travelator system according to claim 3, wherein the acceleration section of the main conveyor is adapted so that the average acceleration experienced by the passenger in the acceleration section is about 0.3 $m/s^2$.

26. The travelator system according to claim 3, wherein the deceleration section of the main conveyor is adapted so that the average deceleration experienced by the passenger in the deceleration section is about 0.3 $m/s^2$.

27. The travelator system according to claim 4, wherein the acceleration section of the branch conveyor is adapted so that the average acceleration experienced by the passenger in the acceleration section is about 0.3 $m/s^2$.

28. The travelator system according to claim 5, wherein the deceleration section of the branch conveyor is adapted so that the average deceleration experienced by the passenger in the deceleration section is about 0.3 $m/s^2$.

29. The travelator system according to claim 1, wherein the travelator system comprises conveyors adapted to be mounted on a fixed base, including a floor, the ground, or some other support surface.

30. The travelator system according to claim 1, wherein at least one shaft of the pluralities of main and branch shafts is driven by a drive apparatus and each other shaft of the pluralities of main and branch shafts is arranged to receive rotational driving power via the pluralities of main and branch belt loops defining the respective conveying surface.

* * * * *